No. 806,611. PATENTED DEC. 5, 1905.
B. R. ADKINS.
WAGON DUMPING MECHANISM.
APPLICATION FILED APR. 27, 1905.

2 SHEETS—SHEET 1.

WITNESSES
Paul A. Blair
Walter Abbe

INVENTOR
Benjamin R. Adkins
BY
Howson and Howson
ATTORNEYS

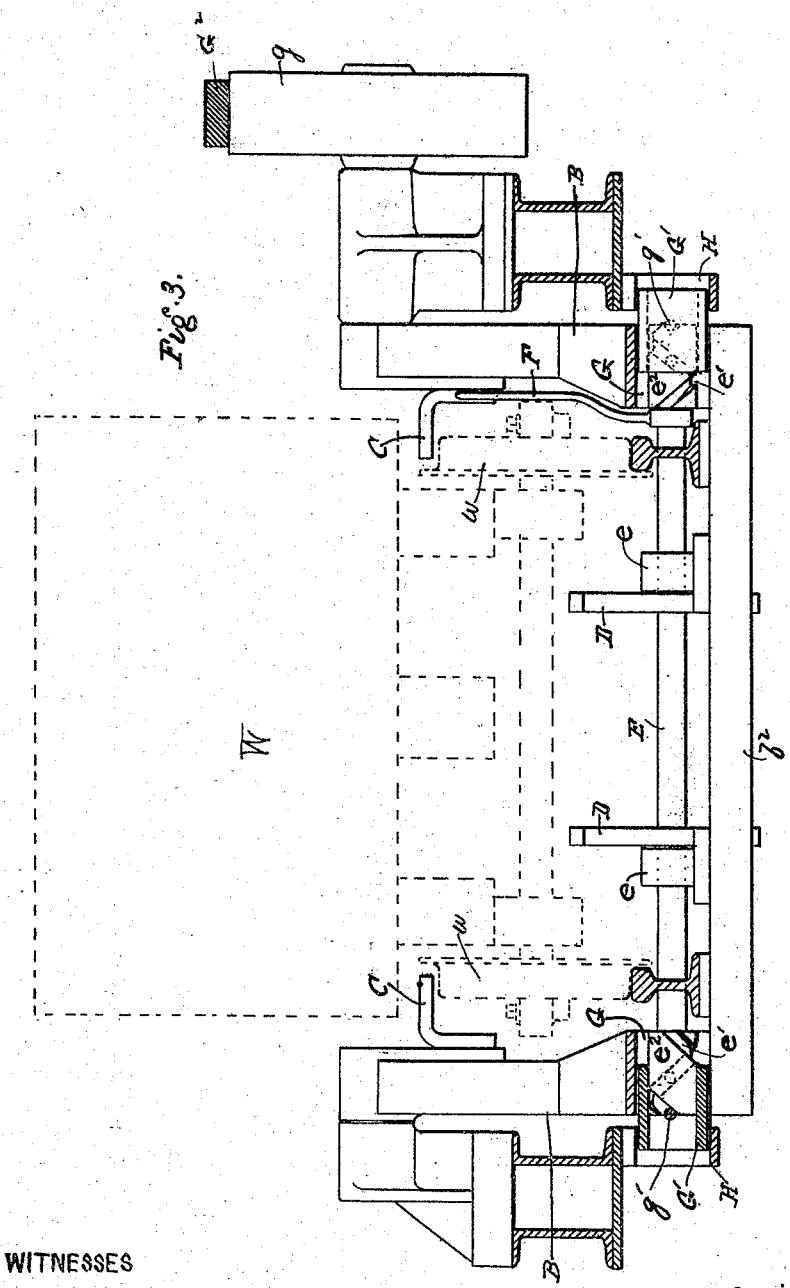

UNITED STATES PATENT OFFICE.

BENJAMIN R. ADKINS, OF FLUSHING, NEW YORK, ASSIGNOR TO S. PEARSON AND SON, INC., OF LONG ISLAND CITY, NEW YORK, A CORPORATION OF NEW YORK.

WAGON-DUMPING MECHANISM.

No. 806,611.     Specification of Letters Patent.     Patented Dec. 5, 1905.

Application filed April 27, 1905. Serial No. 257,626.

*To all whom it may concern:*

Be it known that I, BENJAMIN R. ADKINS, a subject of the King of Great Britain and Ireland, residing in Flushing, in the county of Queens, State of New York, have invented an Improved Wagon-Dumping Mechanism, of which the following is a specification.

The object of my invention is to provide an improved construction of mechanism for dumping or tipping wagons more particularly of the type in which it is desired to provide for crossing the wagon over the tilting platform or cradle when desired without dumping.

Figure 1:
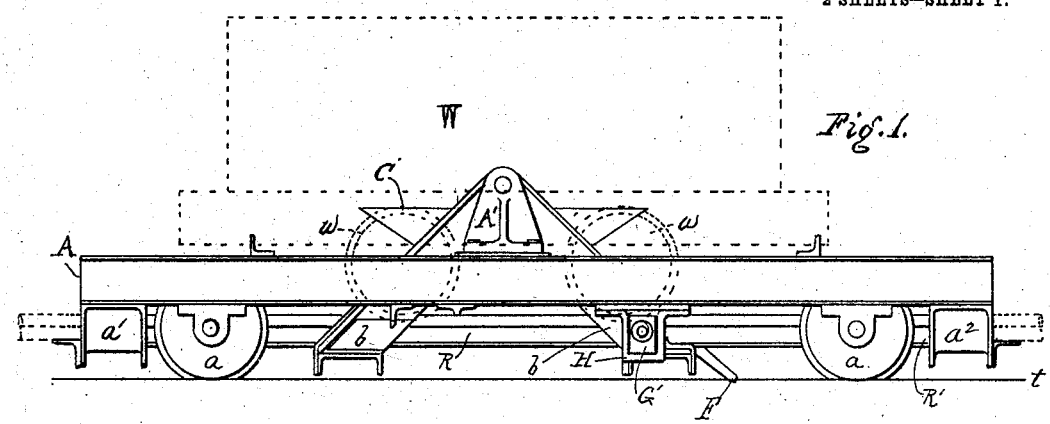
Figure 2:
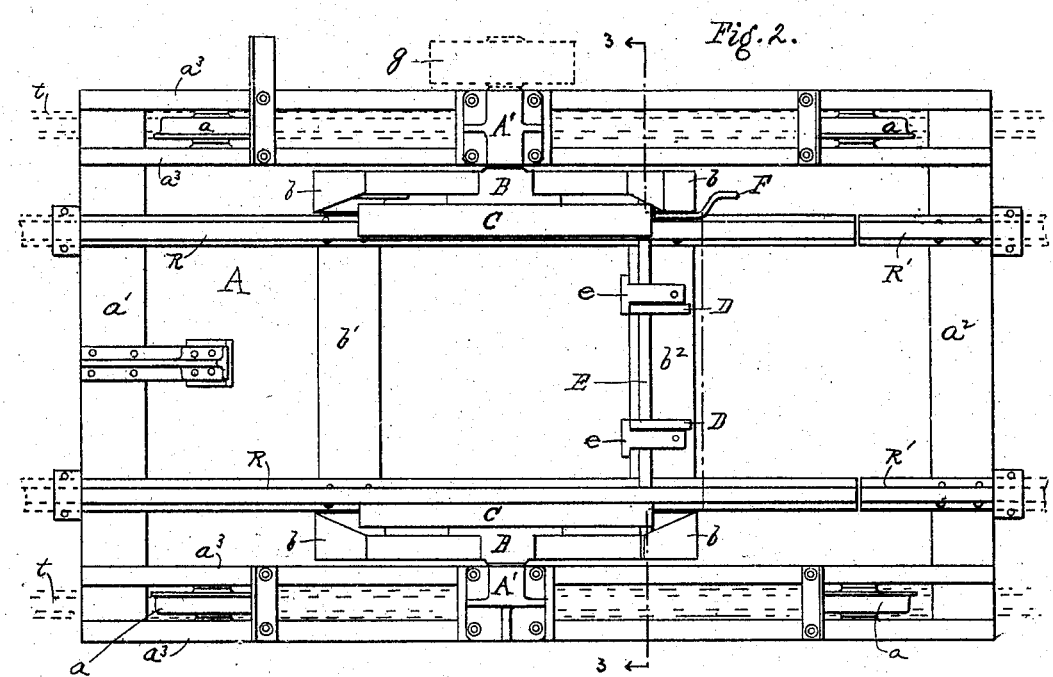
Figure 4:
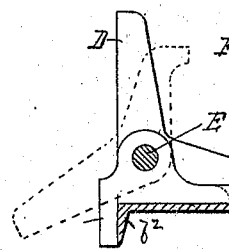
Figure 5:
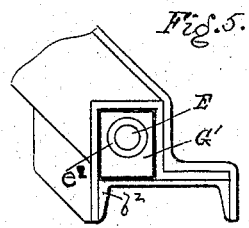

In the accompanying drawings, Figure 1 is a side elevation of my improved mechanism. Fig. 2 is a plan view of the same. Fig. 3 is a transverse section on the lines 3 3, Fig. 2, drawn to a larger scale; and Figs. 4 and 5 show details.

I mount the supporting-frame A upon wheels $a$ $a$ to travel on tracks $t$ $t$, so that the whole apparatus may quickly and easily be moved from one position to another; but when its position has been determined this carriage A is fixed for the time being. In the present instance this frame A is shown as built up of side beams $a^3$ $a^3$ and end cross-beams $a'$ $a^2$; but it may be constructed in any suitable way. On the opposite sides of this open frame are mounted the upright brackets or bearings A' A', in which I mount the trunnions of the tipping platform or cradle B, which is shown as consisting of side brackets $b$ $b$ and cross-bars $b'$ $b^2$, on which are supported the longitudinal rails R R to receive the dumping-wagon W. The rear ends of these rails R R when in horizontal position rest upon the cross-beam $a'$ of the frame A, Figs. 1 and 2. Beyond the forward ends of the rails are short rail ends R' R', secured to the forward cross-beam $a^2$ of the frame A. As shown by dotted lines in Figs. 1 and 2, tracks R R' lead to and from these parts at both ends of the frame. I also secure to the brackets $b$ $b$ flanged plates C C in such a position as to engage either the body or wheels of the truck or wagon W to be dumped. In the drawings I have shown these plates as in position to lie over the wheels $w$ of the wagon, Figs. 1 and 3. On the forward cross-beam $b^2$ of the tilting platform B, I mount a pair of movable stops D D, against which the forward axle of the wagon will abut when the wagon is run onto the tilting platform. These stops are L-shaped levers, as shown in Fig. 4, and are fast upon a shaft E, mounted in bearings $e$ on the cross-beam $b^2$. When the stop-levers are in their upright position, their horizontal arms bear upon the upper face of the cross-beam $b^2$ to support them against the blow and weight of the wagon. The cross-shaft E, upon which these stops are mounted, is provided with a hand-lever F, by which the shaft may be turned to turn down the stops from the position shown in full lines in Fig. 4 to the position shown by dotted lines in that figure, and by full lines in Fig. 3, so that then the wagon may be run over the tipping-platform to the tracks R' beyond. In order to permit this to be done without danger of tipping up the swinging platform B without reference to the brake $G^2$ on the wheel $g$, carried by the pivot of the platform B, I provide a locking means for the platform controlled by the same hand-lever F which manipulates the stops D, so that the same movement of this hand-lever which throws the stops D out of the way serves to throw the locking means into action to lock the platform in horizontal position. For this purpose I provide suitable guides G in the tilting platform (in the case shown at the forward ends of the side brackets $b$) for the laterally-sliding bolts G', and on the two side bars of the frame A, I provide keepers H (each in the form of a stirrup, Fig. 1) to receive these locking-bolts G'. To actuate these locking-bolts, I provide on the opposite ends of the shaft E cylindrical heads $e^2$ $e^2$ with cam-grooves $e'$, into which project pins $g'$ on the interior of the bolts. These latter are made hollow to slide over the ends of the heads $e$. These cam-grooves are such that when the shaft E is turned by the hand-lever F to throw the stops D down and out of the way of the wagon-axles the bolts G' G' will be positively thrown outward laterally and into the keepers H on the frame A, and, on the other hand, when the shaft E is turned to throw the stops up into the position shown by full lines in Fig. 4 to arrest the car to be dumped the bolts G will be withdrawn from the keepers H and the tilting platform be free to be tilted, subject to the control of the brake.

I claim as my invention—

1. The herein-described mechanism for dumping-wagons, comprising a frame, a tilting platform pivoted to the frame and having rails with movable stops, a locking mechanism for the tilting frame, and lever means to operate the stops and at the same time positively throw the locking-bolts to lock the frame when the stops are moved out of the way, and vice versa.

2. The combination of a frame, a tilting platform pivoted thereto, stop-levers for the wagon, a cross-shaft carrying the levers, bolts on the wagon and keepers on the frame, and cam means to throw the bolts in or out on the turning of the shaft.

3. The combination of a frame and a tilting platform, having rails to receive a wagon with L-shaped stop-levers pivoted to rest on a cross-beam of the platform, and when in position to stop the wagon-axle.

In testimony whereof I have signed my name to this specification in the presence of two subscribing witnesses.

BENJAMIN R. ADKINS.

Witnesses:
GEORGE E. MINER,
HUBERT HOWSON.